(12) United States Patent
Lidgett et al.

(10) Patent No.: US 12,096,888 B1
(45) Date of Patent: Sep. 24, 2024

(54) STIRRING UTENSIL

(71) Applicants: Cynthia B. Lidgett, Des Moines, IA (US); Robert W. Lidgett, Des Moines, IA (US)

(72) Inventors: Cynthia B. Lidgett, Des Moines, IA (US); Robert W. Lidgett, Des Moines, IA (US)

( * ) Notice: Subject to any disclaimer, the term of this patent is extended or adjusted under 35 U.S.C. 154(b) by 0 days.

(21) Appl. No.: 18/389,250

(22) Filed: Nov. 14, 2023

(51) Int. Cl.
*A47J 43/10* (2006.01)
*B01F 33/501* (2022.01)

(52) U.S. Cl.
CPC ........ *A47J 43/1075* (2013.01); *B01F 33/5011* (2022.01)

(58) Field of Classification Search
CPC ................................................. A47J 43/10
USPC .......................................................... 366/129
See application file for complete search history.

(56) References Cited

U.S. PATENT DOCUMENTS

| | | | | |
|---|---|---|---|---|
| 1,171,738 | A | * | 2/1916 | Mallet ................. A46B 5/0075 15/236.01 |
| 1,241,307 | A | * | 9/1917 | Tompkins ........... B01F 33/5011 15/236.08 |
| 1,856,769 | A | * | 5/1932 | Latshaw ................ A47J 43/284 D7/688 |
| 5,332,310 | A | | 7/1994 | Wells |
| 5,613,425 | A | | 3/1997 | Krznaric |
| 6,068,395 | A | | 5/2000 | Ondracek |
| 8,540,415 | B2 | * | 9/2013 | Grigori ............... A47J 43/1087 366/328.3 |
| 9,706,878 | B1 | | 7/2017 | Campbell |
| 2012/0060864 | A1 | * | 3/2012 | Nowakowski ....... A46B 5/0095 15/176.1 |
| 2016/0136826 | A1 | * | 5/2016 | Gers-Barlag ......... B26B 21/225 30/529 |

OTHER PUBLICATIONS

Vintage Porridge Stirrer Spurtle Cooking Stick Stirring Stick Stir Stick Vintage Kitchen Oatmeal Stirrer Kitchen Utensil Spoon. Product Listing [online]. © 2023 Etsy, Inc. [retrieved on Mar. 31, 2023]. Retrieved from the Internet: <URL: https://www.etsy.com/listing/178363117/vintage-porridge-stirrer-spurtle-cooking?show_sold_out_detail=1&ref=nla_listing_details>.

Oxo Good Grips Stainless Steel Sauce & Gravy Whisk. Product Listing [online]. 2023 Transform SR Brands LLC. [retrieved on Mar. 31, 2023]. Retrieved from the Internet: <URL: https://www.sears.com/oxos-gravy-and-sauce-whisk-steel-one-size/p-A090485113>.

(Continued)

*Primary Examiner* — David L Sorkin
(74) *Attorney, Agent, or Firm* — Cramer Patent & Design PLLC; Aaron R. Cramer

(57) ABSTRACT

The stirring utensil may comprise a stirring disc, a handle, and a ball and socket joint. The stirring disc may detachably couple to the handle via the ball and socket joint. The stirring utensil may be adapted for a user to stir non-solid food to mix the non-solid food and to separate lumps from the bottom of a pot. As non-limiting examples, the non-solid food may be soup, sauce, or gravy. The stirring disc may make contact with the bottom of the pot to separate the non-solid food from the pot in order to prevent the non-solid food from scorching. The stirring disc may be elevated above the bottom of the pot to mix the non-solid food at all depths. The ball and socket joint may enable the stirring disc to rotate and tilt while stirring.

1 Claim, 2 Drawing Sheets

(56) References Cited

OTHER PUBLICATIONS

Mercer Culinary M37034 Barfly 7-5/8"Stainless Steel Straw/Stirrer With Round Paddle End. Product Listing [online]. © 2006-2023 RestaurantSupply. [retrieved on Mar. 31, 2023]. Retrieved from the Internet: <URL: https://www.restaurantsupply.com/mercer-culinary-m37034-barfly-7-5-8-stainless-steel-straw-stirrer-with-round-paddle-end>.

* cited by examiner

STIRRING UTENSIL

RELATED APPLICATIONS

None.

FIELD OF THE DEVICE

The device of the present application falls under the category of kitchen tools and gadgets, specifically a new type of stirring tool designed to make thick cooking mixtures like gravies, sauces, and soups easier. It aims to solve common problems that come with stirring these foods, like preventing lumps and stopping the mixture from sticking or burning. This tool is meant to be a better alternative to traditional spoons, providing a more comfortable and effective way to stir and cook. It is suitable for both home cooks and professional chefs who need a practical solution for preparing thick and even-textured dishes.

BACKGROUND OF THE DEVICE

The act of making gravies, sauces, soups, and similar culinary concoctions is indeed a fundamental cooking task, yet it's fraught with common difficulties as outlined. These challenges are rooted in the physics and chemistry of cooking-thickening agents like flour or cornstarch, the heat distribution of cookware, the properties of the ingredients, and the cook's technique all play pivotal roles.

When stirring a thick mixture such as gravy, the viscosity requires a utensil that can exert sufficient force to move through the mixture and prevent the flour or starch from settling and clumping. This is particularly troublesome with gravies and thick sauces, where the starch molecules can swell and trap liquid, creating lumps that are resistant to casual stirring.

Reaching all areas of the pot is critical for even heat distribution and to prevent scorching. Traditional spoons, especially when dealing with large volumes, often have insufficient surface area or the wrong shape to scrape the corners and sides of the pot where burning is most likely to begin.

A smooth, even texture is the hallmark of well-made gravy and sauces, and achieving this is a testament to both ingredient ratios and stirring technique. Vigorous stirring is often prescribed, but it must be sustained and consistent, which can be tiring and impractical, especially in a busy kitchen or when multitasking. The innovation of a specialized stirring utensil addresses these ubiquitous challenges. By mitigating the risks of lump formation, uneven cooking, and sticking or burning, a well-designed stirring utensil provides an elegant solution to the needs of both professional chefs and home cooks. This innovation would occupy a niche in kitchenware, reflecting a thoughtful integration of culinary science and ergonomic design, all while remaining accessible in terms of cost and ease of use.

SUMMARY OF THE DEVICE

Embodiments of the present disclosure may include a stirring utensil including a stirring disc with a round footprint, the stirring disc being concave on a side intended to contact the bottom of a pot and convex on the opposing side. Embodiments may also include a plurality of apertures located within the stirring disc, facilitating the passage and mixing of non-solid foods and the removal of lumps. Embodiments may also include a ball and socket joint allowing for rotational and tilting movement of the stirring disc. In some embodiments, the ball may be attached to the stirring disc and the socket and may be located at the distal end of a handle.

In some embodiments, the stirring disc may be detachably coupled to the. Embodiments may also include handle. In some embodiments, the stirring disc includes a standoff projecting. Embodiments may also include axially from the center of the convex side, with the ball of the ball and socket joint attached to the distal end of the standoff.

In some embodiments, the handle may be of sufficient length to maintain. In some embodiments, the user's hand above the surface of non-solid food when the stirring disc may be pressed against the bottom of a pot. In some embodiments, the handle may include a spacer to provide. Embodiments may also include structural strength and a thumb rest.

In some embodiments, the handle and stirring disc may be made of. Embodiments may also include materials selected from the group consisting of heat-resistant food grade nylon, silicone, stainless steel, or any combination thereof. In some embodiments, the plurality of apertures may be equally spaced. Embodiments may also include the periphery of the stirring disc adjacent to the outer edge.

In some embodiments, the stirring disc may be adapted to rotate within. Embodiments may also include three perpendicular planes simultaneously, with 360° axial rotation possible and rotation in the other two planes limited by mechanical interference between the ball and the socket. In some embodiments, the socket retains the ball by a press fit. Embodiments may also include engagement that requires an external force for coupling and uncoupling the stirring disc to and from the handle. In some embodiments, the dimensions of the handle may be twelve inches. Embodiments may also include ±two inches in length, the stirring disc has a diameter ranging from 1.75 to 3.25 inches, and each aperture within the plurality of apertures has a diameter of one-quarter inch±one-sixteenth inch.

Embodiments of the present disclosure may also include a method of using a stirring utensil, the method including, coupling a stirring disc to a handle by aligning and inserting a ball of a ball. Embodiments may also include and socket joint attached to the stirring disc into a socket at the distal end of the handle. Embodiments may also include, placing the stirring disc into a pot containing non-solid food.

Embodiments may also include, stirring the non-solid food with the stirring disc. In some embodiments, the stirring disc contacts the bottom of the pot and may be circulated through the non-solid food. Embodiments may also include, passing the non-solid food through the plurality of apertures within the. Embodiments may also include stirring disc to mix and remove lumps. Embodiments may also include detaching the stirring disc from the handle for cleaning after use.

BRIEF DESCRIPTION OF THE DRAWINGS

The advantages and features of the present device will become better understood with reference to the following more detailed description and claims taken in conjunction with the accompanying drawings, in which like elements are identified with like symbols, and in which:

Figure 1:
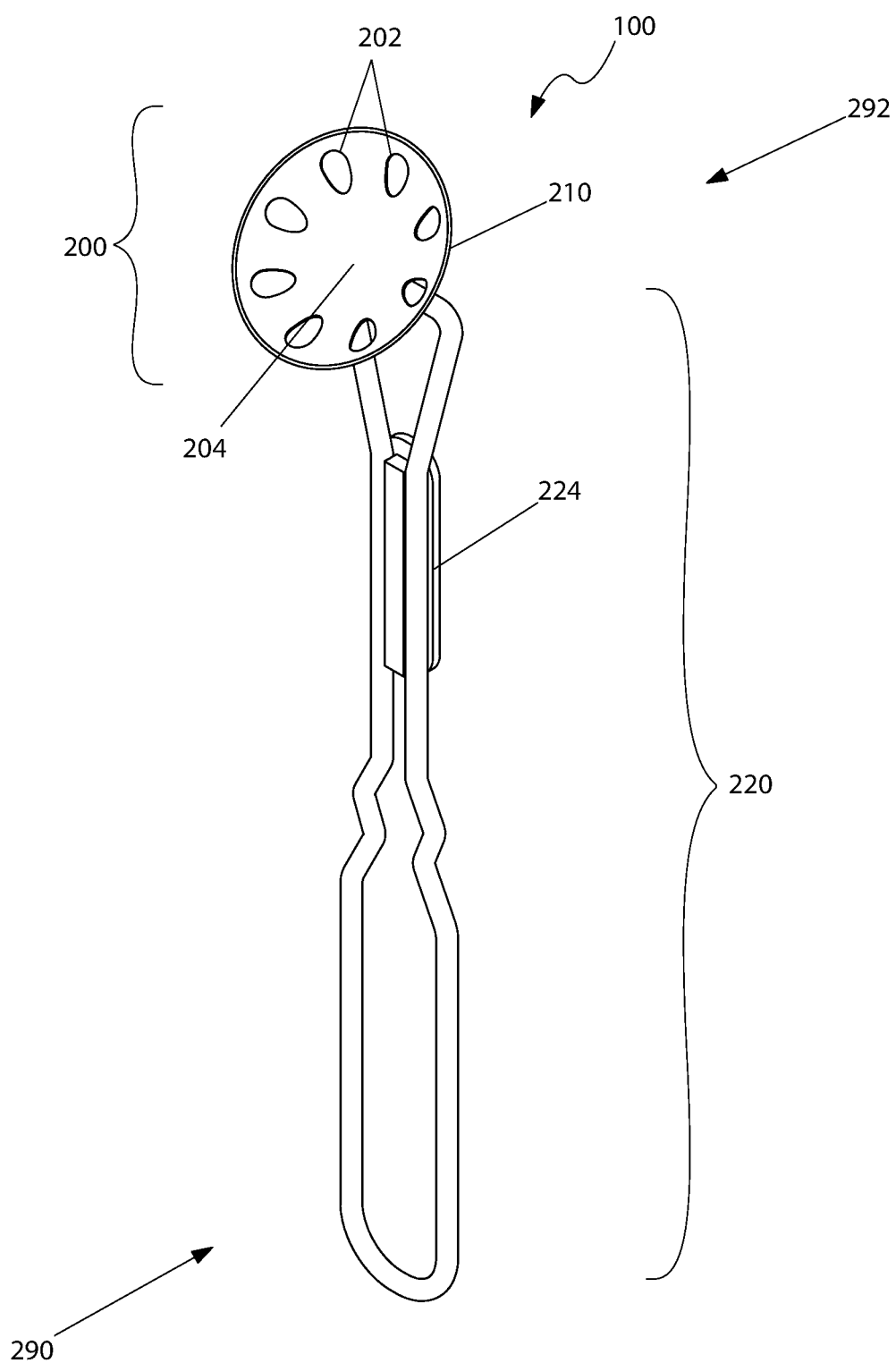
FIG. 1 is a front isometric view of a stirring utensil 100, according to an embodiment of the present device; and, FIG. 2 is a rear isometric view of a stirring utensil 100, according to an embodiment of the present device.
Figure 2:
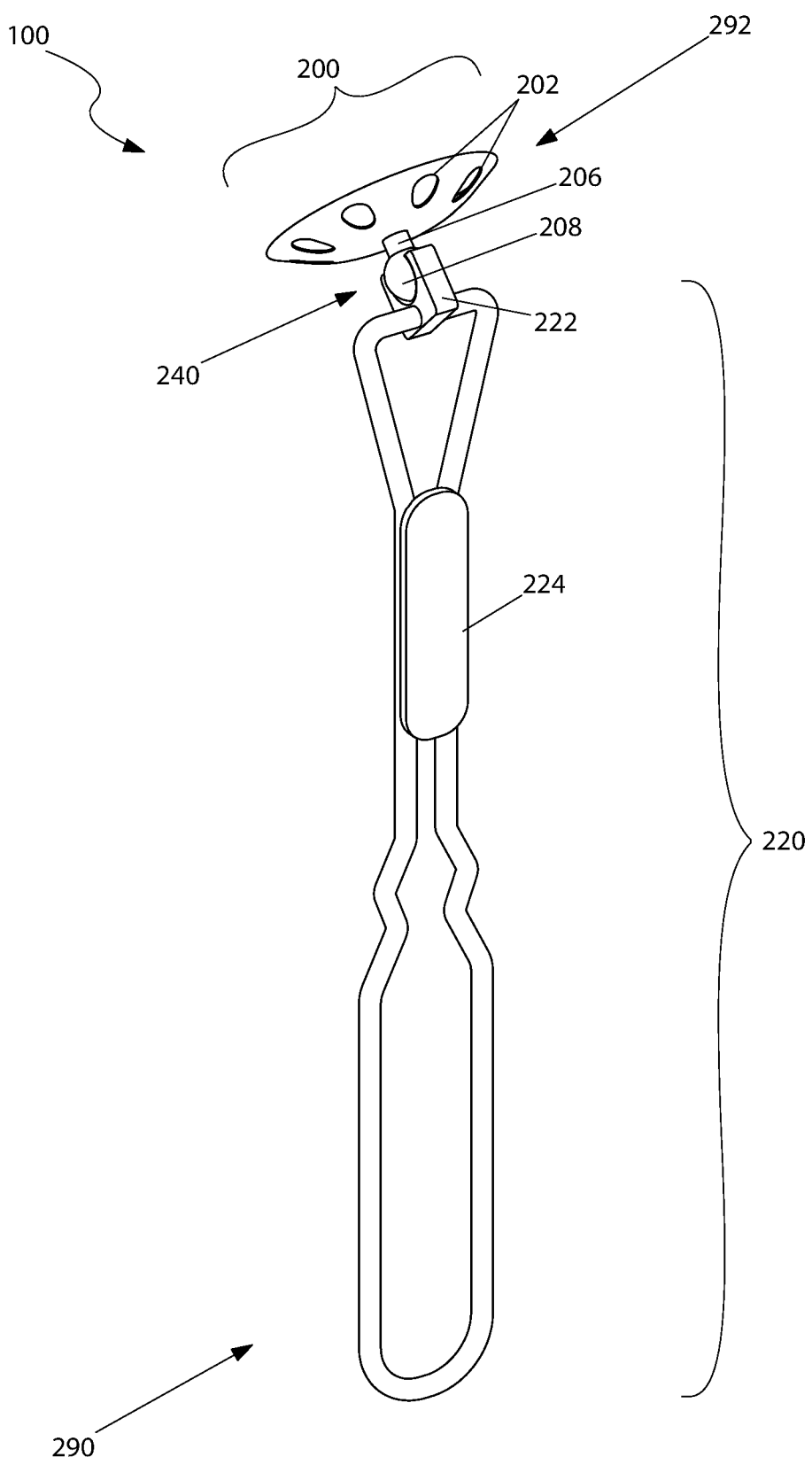

DESCRIPTIVE KEY 100 stirring utensil
200 stirring disc
202 aperture
204 center
206 standoff
208 ball
210 outer edge
220 handle
222 socket
224 spacer
240 ball and socket joint
290 proximal
292 distal 1. Description of the Device The present device is directed to a stirring utensil (herein described as the "device") 100. The device 100 may comprise a stirring disc 200, a handle 220, and a ball and socket joint 240. The stirring disc 200 may detachably couple to the handle 220 via the ball and socket joint 240. The device 100 may be adapted for a user to stir non-solid food to mix the non-solid food and to separate lumps from any depths all the way to the bottom of a pot. As non-limiting examples, the non-solid food may be soup, sauce, or gravy. The stirring disc 200 may make contact with the bottom of the pot to separate the non-solid food from the pot in order to prevent the non-solid food from scorching. The stirring disc 200 may be elevated above the bottom of the pot to mix the non-solid food and remove lumps at all depths. The ball and socket joint 240 may enable the stirring disc 200 to rotate and tilt while stirring.

The stirring disc 200 may detachably couple to the distal 292 end of the handle 220. The stirring disc 200 may have a round footprint. The stirring disc 200 may be concave when viewed from distal 292 side which may contact the pot. The stirring disc 200 may be convex when viewed from the proximal 290 side which may couple to the handle 220.

The stirring disc 200 may comprise a plurality of apertures 202 for mixing the non-solid food as the non-solid food passes through the plurality of apertures 202 while stirring the non-solid food and remove lumps at all depths. The plurality of apertures 202 may be distributed around the stirring disc 200 and may pass from the proximal 290 side of the stirring disc 200 to the distal 292 side of the stirring disc 200. In some embodiments, the plurality of apertures 202 may be equally spaced around the periphery of the stirring disc 200 such that the plurality of apertures 202 are adjacent to the outer edge 210 of the stirring disc 200. In a preferred embodiment, the plurality of apertures 202 may comprise eight (8) apertures 202.

The center 204 of the proximal 290 side of the stirring disc 200 may comprise a standoff 206. The standoff 206 may project axially away from the stirring disc 200. A ball 208 may be coupled to the proximal 290 end of the standoff 206. The ball 208 may be spherical in shape. The ball 208 may comprise one-half (½) of the ball and socket joint 240.

The handle 220 may be an elongated structure that may be adapted for the user to grasp while stirring or otherwise manipulating the device 100. The stirring disc 200 may be detachably coupled to the distal 292 end of the handle 220. The length of the handle 220 be larger than the height of the pot such that the stirring disc 200 may be adapted to press against the bottom of the pot while a user's hand remains above the surface of the non-solid food.

The distal 292 end of the handle 220 may comprise a socket 222. The socket 222 may comprise a partial spherical cavity that may engage the ball 208. The socket 222 may comprise one-half (½) of the ball and socket joint 240. The ball 208 may press fit into the socket 222 so that the socket 222 may retain the ball 208 once an external insertion force has been applied to the stirring disc 200. Inserting the ball 208 into the socket 222 may couple the stirring disc 200 to the handle 220. The ball 208 may be removed from the socket 222 by applying an external removal force to the stirring disc 200. Removing the ball 208 from the socket 222 may detach the stirring disc 200 from the handle 220. As a non-limiting example, the stirring disc 200 may be detached from the handle 220 in order to clean the ball 208 and the socket 222.

In some embodiments, the handle 220 may be an open armature that may reduce heat transfer towards the proximal 290 end of the handle 220. In some embodiments, the open armature may comprise a spacer 224 to strengthen the handle 220 and/or to provide a thumb rest.

The ball and socket joint 240 may comprise the ball 208 and the socket 222. The ball and socket joint 240 may enable the stirring disc 200 to rotate within three (3) perpendicular planes simultaneously. Three hundred sixty degree (360°) axial rotation of the stirring disc 200 may be possible while rotation in the two (2) other planes may be limited by mechanical interference between the ball 208 and the socket 222.

In a preferred embodiment, the handle 220 may be twelve inches with an error of two inches (12.0+/−2.0 in.) long, the stirring disc 200 may have a diameter of one and three-quarters inch to three and one-quarter inches (1.75-3.25 in.), and the diameter of each of the plurality of apertures 202 may be one-quarter inch with an error of one-sixteenth inch (¼+/−¹⁄₁₆ in.).

As non-limiting examples, the handle 220 may be made from heat-resistant food grade nylon, stainless steel, or any combination thereof. The stirring disc 200 may be made from heat-resistant food grade nylon, silicone, stainless steel, or any combination thereof.

In use, the stirring disc 200 may be coupled to the handle 220 by aligning the ball 208 on the stirring disc 200 with the socket 222 on the handle 220 and by applying the external insertion force to the stirring disc 200. The user may grasp the handle 220 and place the stirring disc 200 into the pot to stir the non-solid food. The stirring disc 200 may contact the bottom of the pot to separate the non-solid food from the bottom of the pot. Circulating the stirring disc 200 through the non-solid food above the bottom of the pot may mix the non-solid food as the non-solid food passes through the plurality of apertures 202 in the stirring disc 200. The stirring disc 200 may be detached from the handle 220 for cleaning. Thus, the device 100 is particularly suited to mix the non-solid food and remove lumps at all depths.

The exact specifications, materials used, and method of use of the device 100 may vary upon manufacturing. The foregoing descriptions of specific embodiments of the present device have been presented for purposes of illustration and description. They are not intended to be exhaustive or to limit the device to the precise forms disclosed, and obviously many modifications and variations are possible in light of the above teaching. The embodiments were chosen and described in order to best explain the principles of the device and its practical application, to thereby enable others skilled in the art to best utilize the device and various embodiments with various modifications as are suited to the particular use contemplated.

What is claimed is:

1. A stirring utensil comprising:
- a stirring disc with a round footprint, the stirring disc being concave on a side intended to contact a bottom of a pot and convex on an opposing side;
- a plurality of apertures located within the stirring disc, facilitating a passage and mixing of non-solid foods and a removal of lumps; and,
- a ball and socket joint allowing for rotational and tilting movement of the stirring disc;
- wherein the ball is attached to the stirring disc and the socket and is located at a distal end of a handle;
- wherein the stirring disc is detachably coupled to the handle;
- wherein the stirring disc includes a standoff projecting axially from the center of the convex side, with the ball of the ball and socket joint attached to the distal end of the standoff;
- wherein the handle is configured of a sufficient length to maintain the hand of a user above a surface of non-solid food when the stirring disc is pressed against the bottom of a pot;
- wherein the handle comprises a spacer to provide structural strength and a thumb rest;
- wherein the handle and stirring disc are made of materials selected from the group consisting of heat-resistant food grade nylon, silicone, stainless steel, or any combination thereof;
- wherein the plurality of apertures are equally spaced around a periphery of the stirring disc adjacent to an outer edge;
- wherein the stirring disc is adapted to rotate within three perpendicular planes simultaneously, with 360° axial rotation possible and rotation in the other two planes limited by mechanical interference between the ball and the socket;
- wherein the socket retains the ball by a press-fit engagement that requires an external force for coupling and uncoupling the stirring disc to and from the handle;
- wherein a dimensions of the handle are twelve inches±two inches in length, the stirring disc has a diameter ranging from 1.75 to 3.25 inches, and each aperture within the plurality of apertures has a diameter of one-quarter inch±one-sixteenth inch; and,
- wherein the handle comprises an open armature design to reduce heat transfer towards the proximal end of the handle.

* * * * *